| United States Patent
Wilhelm | [15] 3,687,936
[45] Aug. 29, 1972 |

[54] 11-AMINOALIPHATIC-5:10-METHANODIBENZO [a:d] [1:4] CYCLOHEPTADIENES AND THE SALTS THEREOF

[72] Inventor: Max Wilhelm, Allschwil, Switzerland

[73] Assignee: Ciba-Geigy AG, Basel, Switzerland

[22] Filed: Sept. 27, 1968

[21] Appl. No.: 764,046

Related U.S. Application Data

[63] Continuation-in-part of Ser. No. 456,828, May 18, 1965, Pat. No. 3,423,425.

[30] Foreign Application Priority Data

June 19, 1964 Switzerland ............... 8060/64
June 19, 1964 Switzerland ............... 8061/64

[52] U.S. Cl. ............................................. 260/239 B
[51] Int. Cl. ............................................. C07d 87/26
[58] Field of Search .260/247, 570.8, 240 TC, 239 B, 260/268 PC, 293.62

Primary Examiner—Alex Mazel
Assistant Examiner—Jose Tovar
Attorney—Harry Goldsmith

[57] ABSTRACT

5:10-Methanodibenzo [a:d] [1:4]cycloheptadienes containing in 11-position and aliphatic hydrocarbon radical substituted by a cyclic amino group, and their salts. The compounds may contain further substituents, except in 11-position.

The compounds are useful, inter alia, as sedatives, tranquilizers and histaminolytics.

6 Claims, No Drawings

11-AMINOALIPHATIC-5:10-METHANODIBENZO [A:D] [1:4] CYCLOHEPTADIENES AND THE SALTS THEREOF

CROSS-REFERENCE TO RELATED APPLICATIONS

This is a continuation in part of my application Ser. No. 456,828, filed May 18, 1965, now U.S. Pat. No. 3,423,425.

SUMMARY OF THE DISCLOSURE

The present invention relates to new cycloheptadienes. Especially it concerns 5:10-methanodibenzo[a:dfc-[1:4]cycloheptadienes that contain in 11-position an aliphatic hydrocarbon radical substituted by an amino group as the only substituent, and their salts.

The new compounds may contain further substituents. For example, substituents may be present on the aromatic nuclei (positions one to four and six to nine). Such substituents are above all lower alkyl radicals, lower alkoxy groups, halogen atoms or trifluoromethyl groups.

The new compounds may also be substituted in five-position and/or 12-position, for example, by hydrocarbon radicals, for example, alkyl radicals.

Alkyl radicals are primarily lower alkyl radicals, such as methyl, ethyl, propyl, isopropyl or straight-chain or branched butyl, pentyl or hexyl radicals bound in any position.

The lower alkoxy groups are, in particular, methoxy, ethoxy, propoxy or butoxy groups, and the halogen atoms are fluorine, chlorine or bromine.

The hydrocarbon radical in 11-position that is substituted by an amino group is, in particular, an aminoalkyl radical or an amino-alkylidene radical in which the amino group may be unsubstituted or substituted.

The substituents of the amino group are above all lower hydrocarbon radicals that may also be interrupted by hetero-atoms, for example, oxygen, sulfur or nitrogen atoms and that may be bonded to the alkyl or alkylidene radical and/or substituted by free hydroxyl groups. As lower hydrocarbon radicals there may be mentioned above all lower alkyl radicals, for example, methyl, ethyl, propyl, isopropyl, straight chain or branched butyl, pentyl or hexyl or heptyl radicals bound in any position, unsubstituted or alkyl-substituted cycloalkyl radicals, for example, cyclopentyl, cyclohexyl, cycloheptyl radicals, or alkylene radicals, especially alkylene radicals having three to seven chain members, for example, butylene(1:4), pentylene(1:5), 1:5-dimethylpentylene-(1:5), hexylene(1:6) and hexylene (1:5) radicals. Radicals of the kind defined that are interrupted by hetero atoms are, for example, oxa-, aza- or thia-alkylene radicals, especially such radicals having three to seven chain members, for example, 3-aza-, 3-oxa- or 3-thia-pentylene-(1:5), 3-aza-hexylene-(1:6), 1:5-dimethyl-3-aza-pentylene-(1:5), 3-methyl-3-aza-pentylene-(1:5) or 3-hydroxy-ethyl-3-aza-pentylene-(1:5) radicals. Amino-alkyl or -alkylidene radicals in which a substituent of the amino group is bonded to the alkyl radical are, for example, N-alkyl-pyrrolidinyl-alkyl or -alkylidene radicals or N-alkyl-piperidylalkyl or -alkylidene radicals.

The amino group is primarily a secondary or tertiary amino group, for example, a methylamino, ethylamino or propylamino group or a di-lower-alkylamino group, for example, a dimethylamino, diethylamino, dipropylamino or N-methyl-N-ethylamino group, an N-lower-alkyl-N-cycloalkylamino group, for example, an N-methyl-N-cyclopentyl- or -cyclohexylamino group, or a pyrrolidino or piperidino group which may be mono-unsaturated (i.e., carry one double bond) in the β-position of its ring and/or be C-lower alkylated, or a possibly C-lower alkylated morpholine, thiamorpholino, piperazino,N'-lower alkylpiperazino or N'-(hydroxy-lower alkyl)-piperazino group, for example, the pyrrolidino, piperidino, morpholino, piperazino, N'-methyl-piperazino or N'-(β-hydroxyethyl)-piperazino group.

The alkyl or alkylidene radical carrying the amino group is, in particular, a lower alkyl or alkylidene radical, for example, a methyl, ethyl, ethylidene, propyl, propylidene, butyl or butylidene radical.

The new compounds possess valuable pharmacological properties that can be demonstrated by experiments on animals, for example, on the mouse, the cotton rat, the white-eared marmoset and the fish *Betta splendens*. For example, they have a central inhibitory action that is characterized by an antagonism towards psychomotory substances, for example, mescaline, and by inhibition of the transmission of spinal reflexes, and can therefore be used as sedatives and tranquillizers. In particular, the new compounds have a histaminolytic action, which is shown, for example, by experiments on guinea pigs, and thus can be used as histaminolytic agents. Furthermore, the new compounds can also be used as starting materials or intermediate products in the manufacture of other valuable compounds.

Compounds that are specially valuable are those of the formula

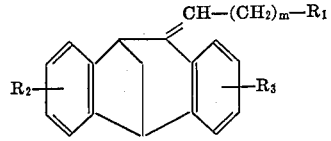

or, above all, compounds of the formula

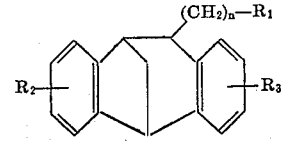

in which $R_1$ represents a free amino group or a mono- or di-lower alkylamino group or a pyrrolidino, piperidino, morpholino or piperazino group, for example, an N'-lower alkyl- or N'-hydroxy lower alkyl-piperazino group, $n$ represents an integer of 1 to 4 and $m$ represents an integer of 1 to 3, and the radicals $R_2$ and $R_3$ represent hydrogen atoms, lower alkyl groups, halogen atoms or trifluoromethyl groups, or compounds of the above formulas in which $R_2$ and $R_3$ have the meanings given above and the radicals $—(CH_2)_nR_1$ and $=CH—(CH_2)_m—R_1$ represent N-lower alkyl-pyrrolidinyl-(2) or N-lower alkyl-piperidinyl-(2)-alkyl or -alkylidene radicals, for example, the N-methyl-pyrrolidinyl-(2)- or N-methyl-piperidinyl-(2)-ethyl or -ethylidene radical.

Especially valuable is the 11-(γ-dimethylaminopropyl)-5:10-methanodibenzo[a:d]f[1:4]cycloheptadiene which e.g., in the form of its hydrochloride when administered in a dose from 0.03 mg/kg s.c. protects a guinea pig from death caused by a lethal dose (e.g., 0.75 mg/kg i.v.) of histamine.

The new compounds are prepared by methods in themselves known.

For example, the procedure is to treat a 5:10-methanodibenzo[a:dfc[1:4]cycloheptadiene that contains in 11-position as only substituent an aliphatic radical substituted by a reactive esterified hydroxyl group, with ammonia or a primary or secondary amine.

A reactive esterified hydroxyl group is, for example, a hydroxyl group esterified with a strong organic or inorganic acid, for example, a halogen atom, for example, chlorine or bromine, or an arylsulfonyloxy group, for example, a para-toluenesulfonyloxy group.

The reaction is carried out in the usual manner.

Another method for preparing the new compounds consists in reducing in a 5:10-methanodibenzo[a:d][1:4]cycloheptadiene that contains in 11-position as only substituent an aliphatic hydrocarbon radical substituted by an amino group and having an oxo group attached to at least one of the carbon atoms that is bonded to the nitrogen atom of the said amino group, the oxo group into the methylene group by treatment with lithium-aluminiumhydride.

A further method for the manufacture of the new compounds consists in reducing in a 5:10-methanodibenzo-[a:d][1:4]cycloheptadiene that contains in 11-position as only substituent an aliphatic hydrocarbon radical substituted by a cyano group, the cyano group into the aminomethyl group. The reduction is carried out, e.g., by means of nascent hydrogen, for example, zinc and mineral acids, or by means of catalytically activated hydrogen, for example, hydrogen in the presence of hydrogenation catalysts, for example, palladium, nickel or platinum catalysts, or with lithium aluminum hydride.

The new compounds may also be obtained when a 5:10-methanodibenzo[a:d][1:4]cycloheptadiene that contains in 11-position as only substituent an aliphatic hydrocarbon radical substituted by a hydroxyimino or nitro group or an imino group that may be substituted, for example, by the substituents indicated for the amino group, is reduced. Reduction is carried out in the customary manner, in particular, by means of catalytically activated hydrogen, for example, hydrogen in the presence of a hydrogenation catalyst, for example, a platinum, nickel or palladium catalyst, for example, platinum oxide, Raney nickel or palladium carbon. However, the groups indicated may also be reduced with a metal or with a complex metal hydride. For example, hydroxyimino groups in particular, can be reduced with sodium in alcohol or sodium amalgam or stannous chloride and hydrochloric acid. Nitro groups may be converted into an amino group, for example, by reduction with iron and hydrochloric acid or with aluminum amalgam. Imino groups (Schiff's bases) may be reduced, for example, with lithium-aluminum hydride or above all with sodium boron hydride. The reductions are carried out in the usual manner. A double bond that may be present in the aliphatic radical may be hydrogenated at the same time, depending on the method of working adopted, especially in the case of the catalytic reduction of the groups indicated.

Another method of manufacturing the new compounds consists in treating a 5:10-methanodibenzo[a:dfc[1:4]cycloheptadiene that contains in 11-position a hydroxy group and an aliphatic hydrocarbon radical substituted by an amino group joined at 11-position by a single bond, in such a manner that water is split off with formation of a double bond. The reaction is advantageously carried out by treatment with a strong acid, for example, a mineral acid, for example, sulfuric acid or a hydrohalic acid such as hydrochloric acid or hydrobromic acid.

Further substituents that may be present in the end products may be introduced by known methods into the compounds thus obtained. For example, in the case of compounds that contain an amino group having at least one hydrogen atom, a substituent may be introduced into the said group. This can be done, for example, by reaction with a reactive ester of an appropriate alcohol or by reductive alkylation, that is to say, by reaction with an appropriate oxo compound and subsequent reduction. Suitable reactive esters are, in particular, those already indicated. The reducing agents used are primarily catalytically activated hydrogen or di-light metal hydrides, for example, sodium boron hydride.

Furthermore, in the case of compounds obtained that have double bonds in the radical in 11-position, the said double bonds can be hydrogenated. For example, 11-aminoalkylidene compounds that are obtained can be reduced to the corresponding aminoalkyl compounds. Reduction is carried out in the customary manner, preferably by treatment with hydrogen in the presence of a hydrogenation catalyst, for example, a nickel, platinum or palladium catalyst.

In the case of compound obtained that are substituted at the amino group by hydrogenolytically eliminable radicals, for example, α-arylalkyl or benzyl radicals, the said radicals can be split off in the usual manner by hydrogenolysis.

The end products are obtained in the free form or in the form of their salts, depending on the conditions under which the process is carried out; the salts are also included in the invention. Salts that are obtained can be converted into the free bases in known manner, for example, with alkalis or ion exchangers. Free bases that are obtained can be converted into salts by reaction with organic or inorganic acids, especially those that are suitable for the formation of therapeutically useful salts. Such acids are, for example, hydrohalic acids, sulfuric acids, phosphoric acids, nitric acid, perchloric acid, aliphatic, alicyclic, aromatic or heterocyclic carboxylic or sulfonic acids, for example, formic acid, acetic acid, propionic acid, succinic acid, glycollic acid, lactic acid, malic acid, tartaric acid, citric acid, ascorbic acid, maleic acid, hydroxymaleic acid and pyroracemic acid; phenylacetic acid, benzoic acid, para-aminobenzoic acid, anthranilic acid, para-hydroxybenzoic acid, salicylic acid, para-aminosalicylic acid, embonic acid, methanosulfonic acid, ethanesulfonic acid, hydroxyethanesulfonic acid, and ethylenesulfonic acid; halogenbenzene sulfonic acid, toluenesulfonic acid, napthalenesulfonic acid and sulfanilic acid; methionine, tryptophan, lysine and arginine.

These or other salts of the new compounds, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process in which an intermediate product obtainable at any stage of the process is used as starting material and any remaining steps are carried out, or in which the starting materials are formed under the reaction conditions, or in which the reaction components may be used in the form of their salts.

Mainly those starting materials should be used in the reactions of the invention that lead to the formation of those compounds indicated above as being specially valuable.

The 5:10-methanodibenzo[a:d][1:4]cycloheptadienes, that contain a hydroxy group in 11-position and an aliphatic hydrocarbon radical substituted by an amino group that is joined at 11-position by a single bond, used as starting materials may be obtained, for example, by treating an 11-oxo-5:10-methanodibenzo[a:d][1:4]cycloheptadiene with an organometallic compound of the formula

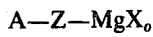

in which A represents an amino group, Z represents an aliphatic hydrocarbon radical, and $X_o$ represents a halogen atom.

The 11-oxo-5:10-methanodibenzo[a:d][1:4]-cycloheptadienes required for this purpose are new.

It has been found that these 11-oxo-5:10-methano dibenzo [a:d] 1:4 cycloheptadienes are obtained by solvolyzing an appropriate 9:10-dihydro-9:10-ethanoanthracene which contains a sulfonyloxy group in the 11-position and, if desired, hydrolyzing the resulting compounds and oxidizing the resulting 11-hydroxy-5:10-methanodibenzo [a:d][1:4]-cycloheptadienes to the 11-oxo compounds.

The sulfonyloxy groups are, in particular, hydroxyl groups esterified with alkyl or arylsulfonic acids, for example, a benzene sulfonyloxy group, a para-toluenesulfonyloxy group or a para-bromobenzene-sulfonyloxy group.

The 11-hydroxy compounds are obtained directly when the solvolysis is carried out in water or in an aqueous solvent, for example, aqueous acetone, aqueous lower alkanols, for example, aqueous methanol or ethanol. The reaction is advantageously carried out in a neutral or slightly basic medium and preferably at an elevated temperature. When solvolysis is carried out in anhydrous solvolzing solvents, for example, lower alkane carboxylic acids such as formic acid or acetic acid, the corresponding 11-lower alkanoyloxy compounds are obtained first which are then hydrolyzed in known manner to the 11-hydroxy compounds. The reaction is advantageously carried out in the presence of a salt of the carboxylic acid selected, for example, an alkali metal salt such as the sodium or potassium salt, and at an elevated temperature.

Oxidation of the 11-hydroxy group to form the 11-oxo group is carried out by a method in itself known, for example, by the Oppenauer method or by treatment with one of the customary oxidizing agents, for example, a cupric salt, mangenese dioxide or, above all, with a compound of hexavalent chromium, for example, sodium dichromate, or especially chromium(VI)oxide. Oxidation is carried out as usual.

By virtue of their physical properties, mixtures of stereo-isomers that are obtained can be separated in the usual manner, for example, by fractional crystallization or adsorption, elution and crystallization.

The remaining starting materials are known or, if they are new, may be prepared by methods in themselves known, for example, from the 11-hydroxy- or 11-oxo-5:10-methanodibenzo[a:d][1:4]cycloheptadienes indicated above.

Compounds that contain one or more asymmetrical carbon atoms may be in the form of racemate mixtures, pure racemates or optical antipodes.

Mixtures of racemates, by virtue of the physico-chemical differences between the components, can be resolved into the stereoisomeric pure racemates (diasteroisomers) in known manner, for example, by chromatography and/or fractional crystallization.

Racemic starting materials or end products can likewise be resolved into the optical antipodes by known methods, for example, as follows: the racemic bases, dissolved in a suitable inert solvent, are reacted with an optically active acid, and the salts obtained are separated into the diastereoisomers (for example, by utilizing their different degree of solubility) from which the antipodes of the new bases can be liverated by the action of an alkaline agent. Optically active acids that are widely used are d-tartaric acid and l-tartaric acid, di-orthotoluyl tartaric acid, malic acid, mandelic acid, camphorsulfonic acid and quinic acid. Separation can also be carried out, for example, by recrystallizing the pure racemate obtained from an optically active solvent.

The new compounds can be used in the free form or in the form of their salts, for example, for the manufacture of pharmaceutical preparations containing the said compounds in admixture with organic or inorganic, solid or liquid pharmaceutical excipients suitable for enteral or patenteral administration. Suitable excipients are substances that do not react with the new compounds, for example, water, gelatine, lactose, starch, stearyl alcohol, magnesium stearate, talc, vegetable oils, benzyl alcohols, gums, propylene glycols, white petroleum jelly and other known medicinal excipients. The pharmaceutical preparations may be, for example, tablets, dragees or capsules, or in liquid form as solutions, suspensions or emulsions. They may be sterilized and/or contain adjuvants such as preserving, stabilizing, wetting or emulsifying agents, solution promoters, salts for regulating the osmotic pressure or buffers. They may further contain other therapeutically valuable substances. The pharmaceutical preparations are prepared by conventional methods.

The following Examples illustrate the invention.

EXAMPLE 1

12 Grams of 11-hydroxy-11-(γ-dimethylaminopropyl)-5:10-methanodibenzo[a:d] [1:4]cycloheptadiene are heated for 3 hours at the boil in 20 milliliters of concentrated hydrochloric acid and 60 milliliters of glacial acetic acid. The reaction mixture is then evaporated in vacuo at 100°C. 50 Milliliters of 2N sodium hydroxide solution are added to the residue and the batch is extracted with methylene chloride. The organic layer is washed with water, dried and evaporated. The residue comprises 11-(γ-dimethylaminopropylidene)-5:10-methanodibenzo-[a:d][1:4]cycloheptadiene of the formula

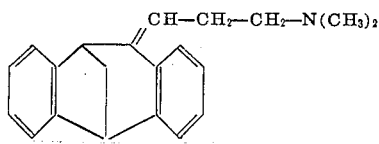

whose hydrochloride melts at 211°C.

The 11-hydroxy-11-(γ-dimethylaminopropyl)-5:10-methanodibenzo[a:dfc[1:4]cycloheptadiene used as starting material can be prepared in the following manner:

125 Grams of anhydrous sodium acetate are added to a solution of 500 grams of 11-(para-toluenesulfonyloxy)-9:10-dihydro-9:10-ethanoanthracene (m.p. 160° to 163°C; prepared by reacting 11-hydroxy-9:10-dihydro-9:10-ethanoanthracene with para-toluene sulfonyl chloride in pyridine) in 2.5 liters of glacial acetic acid, and the whole is stirred for 5 hours at 120°C. The acetic acid is subsequently distilled off in vacuo. 500 Milliliters of water and 500 milliliters of ether are added to the residue, and the ether layer is extracted several times with 2N sodium hydroxide solution. The batch is dried, the ether is evaporated, the oil that remains is dissolved in 1.2 liters of methanol, 480 milliliters of 2N sodium hydroxide solution are added, and the batch is heated for 2 hours at 70°C. The methanol is evaporated and the residue is extracted with ether. The ether layer is washed with water, dried and evaporated. The residue comprises 11-hydroxy-5:10-methanodibenzo[a:d][1:4]-cycloheptadiene of the formula

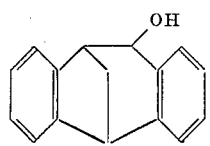

melting at 113°C after recrystallization from alcohol.

12 Grams of chromium(VI)oxide in 30 milliliters of water are added to a solution of 25 grams of 11-hydroxy-5:10-methanodibenzo[a:d][1:4]cycloheptadiene in 200 milliliters of glacial acetic acid, and the whole is stirred for 10 hours at 50°C. The reaction mixture is subsequently cooled to room temperature, and 500 milliliters of water are added. The precipitate is dissolved in methylene chloride and extracted with 2N sodium hydroxide solution. After drying and evaporation of the solvent, the substance that remains is 11-oxo-5:10-methanodibenzo[a:d][1:4]cycloheptadiene of the formula

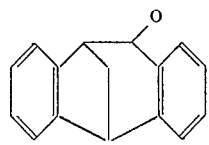

melting at 113° to 115°C after recrystallization from methanol.

1 Milliliter of methyliodide is added to 6.3 grams of magnesium shavings in 150 milliliters of absolute ether. As soon as the reaction commences, the batch is heated to the boil and 12 grams of γ-dimethylaminopropyl chloride in 150 milliliters of absolute ether are added dropwise. When the chloride has been added, 1 milliliter of methyliodide is added and boiling is continued for a further 30 minutes. 17 Grams of 11-oxo-5:10-methanodibenzo[a:d]-[1:4]cycloheptadiene in 150 milliliters of absolute ether are then added dropwise, and boiling is continued for 6 hours under reflux. After cooling the reaction mixture, 200 milliliters of a 10 percent ammonium chloride solution are added and the batch is extracted with 500 milliliters of methylene chloride. The organic layer is washed with water, dried and evaporated. The crystalline residue comprises 11-hydroxy-11(γ-dimethylaminopropyl)-5:10-methanodibenzo[a:dfc[1:4]cycloheptadiene of the formula

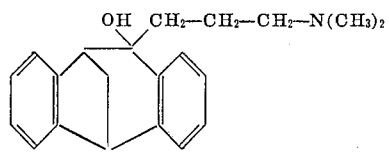

melting at 118° to 120°C after recrystallization. The hydrochloride melts at 163° to 165°C.

The 11-hydroxy-5:10-methano-dibenzo[a:d][1:4]-cycloheptadiene described as intermediate above may also be prepared in the following manner:

A solution of 10 grams of 11-(para-toluenesulfonyloxy)-9:10-dihydro-9:10-ethanoanthracene in 200 milliliters of alcohol and 50 milliliters of 2N sodium hydroxide solution is boiled for 2 hours under reflux. Subsequently, the solvent is evaporated in vacuo, the residue is dissolved in methylene chloride and extracted with water. 11-Hydroxy-5:10-methanodibenzo[a:d][1:4]cycloheptadiene melting at 110° to 112°C is obtained after drying and evaporation of the methylene chloride. After recrystallization from alcohol, the product melts at 113°C and, according to its infra-red spectrum and mixed melting point, is identical with the above described compound.

EXAMPLE 2

12 Grams of 11-(γ-dimethylaminopropylidene)-5:10-methanodibenzo[a:d]f[1:4]cycloheptadiene are dissolved in 100 milliliters of alcohol, 1 gram of 10 percent palladium carbon is added and hydrogenation is carried out at room temperature. After the theoretical amount of hydrogen has been taken up, the catalyst is filtered off. The filtrate is evaporated to dryness in vacuo. The residue comprises 11-(γ-dimethylaminopropyl)-5:10-methanodibenzo-[a:d][1:4]-cycloheptadiene of the formula

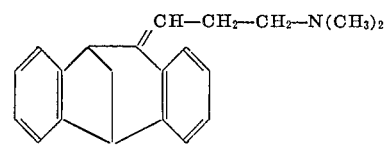

whose hydrochloride melts at 167°C.

EXAMPLE 3

In an analogous manner to that described in Examples 1 and 2 starting from 11-oxo-5:10-methanodibenzo[a:d][1:4]cycloheptadiene and γ-(hexamethyleneimino)-propylchloride, γ-morpholinopropylchloride, γ-piperidinopropylchloride or γ-pyrrolidinopropylchloride, a. 11-(γ-hexamethyleneiminopropylidene)-5:10-methanodibenzo[a:dfc[1:4]cycloheptadiene,
b. 11-(γ-hexamethyleneiminopropyl)-5:10-methanodibenzo[a:dfc[1:4]cycloheptadiene,
c. 11-(γ-morpholinopropylidene)-5:10-methanodibenzo[a:dfc-[1:4]cycloheptadiene,
d. 11-(γ-morpholinopropyl)-5:10-methanodibenzo[a:dfc[1:4]-cycloheptadiene,
e. 11-(γ-piperidinopropylidene)-5:10-methanodibenzo[a:dfc-[1:4]cycloheptadiene,
f. 11-(γ-piperidinopropyl)-5:10-methanodibenzo[a:dfc[1:4]cycloheptadiene,
g. 11-(γ-pyrrolidinopropylidene)-5:10-methanodibenzo-[a:d][1:4]cycloheptadiene, or
h. 11-(γ-pyrrolidinopropyl)-5:10-methanodibenzo[a:dfc-[1:4]cycloheptadiene, respectively, can be obtained.

I claim:
1. A member selected from the group consisting of compounds of the formulas

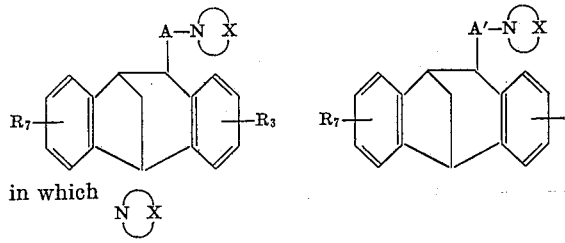

in which $-N\overset{\frown}{\underset{\smile}{\phantom{X}}}X$ is a member selected from the group consisting of pyrrolidino, piperidino, morpholino, piperazino, N'-lower alkyl-piperazino N'-(β-hydroxyethyl)-piperazino and hexamethyleneimino, A is lower alkylene, A' is lower alkylidene and $R_3$ and $R_7$ are each hydrogen, and acid addition salts thereof.

2. A product as claimed in claim 1, in which A stands for 1,3-propylene and A' for 1,3-propylidene.

3. A product as claimed in claim 2, in which

stands for pyrrolidino.

4. A product as claimed in claim 2, in which

stands for piperidino.

5. A product as claimed in claim 2, in which

stands for morpholino.

6. A product as claimed in claim 2, in which

stands for hexamethyleneimino.

* * * * *

PO-1050
(5/69)

UNITED STATES PATENT OFFICE
CERTIFICATE OF CORRECTION

Patent No. 3,687,936                     Dated August 29, 1971

Inventor(s)  MAX WILHELM

It is certified that error appears in the above-identified patent and that said Letters Patent are hereby corrected as shown below:

Column 1, line [73] should read

CIBA-GEIGY Corporation, Ardsley, New York

Signed and sealed this 26th day of February 1974.

(SEAL)
Attest:

EDWARD M. FLETCHER, JR.            C. MARSHALL DANN
Attesting Officer                  Commissioner of Patents